(12) United States Patent
Jäger (10) Patent No.: US 11,647,696 B2
(45) Date of Patent: May 16, 2023

(54) BELT AS CONTINUOUS TRACTION MEANS FOR CONVEYOR BELTS OF BALING PRESSES OR BALE WRAPPERS

(71) Applicant: ARNOLD JÄGER HOLDING GMBH, Hannover (DE)

(72) Inventor: Sebastian Jäger, Hannover (DE)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 5 days.

(21) Appl. No.: 17/128,645

(22) Filed: Dec. 21, 2020

(65) Prior Publication Data
US 2021/0185935 A1    Jun. 24, 2021

(30) Foreign Application Priority Data

Dec. 20, 2019  (EP) ..................................... 19218795

(51) Int. Cl.
| | |
|---|---|
| *B65G 15/34* | (2006.01) |
| *B65G 15/30* | (2006.01) |
| *A01F 15/18* | (2006.01) |

(52) U.S. Cl.
CPC .............. *A01F 15/18* (2013.01); *B65G 15/34* (2013.01); *A01F 2015/183* (2013.01)

(58) Field of Classification Search
None
See application file for complete search history.

(56) References Cited

U.S. PATENT DOCUMENTS

| | | | |
|---|---|---|---|
| 4,106,613 A * | 8/1978 | Thomson ............... | B65G 15/34 |
| | | | 139/415 |
| 5,519,990 A | 5/1996 | Rodewald | |
| 6,371,280 B1 | 4/2002 | Lindner | |
| 8,640,862 B2 | 2/2014 | Perrin | |
| 9,828,180 B2 * | 11/2017 | Marchetti ............. | B29D 29/06 |
| 10,244,682 B2 * | 4/2019 | Hülsmann ............... | A01F 15/07 |
| 11,192,722 B2 * | 12/2021 | Jäger ....................... | B32B 38/00 |
| 2008/0078657 A1 * | 4/2008 | Hawkins ................ | B65G 15/34 |
| | | | 198/846 |

(Continued)

FOREIGN PATENT DOCUMENTS

| | | |
|---|---|---|
| CN | 2401513 Y | 10/2000 |
| CN | 101454591 A | 6/2009 |

(Continued)

OTHER PUBLICATIONS

Chinese Office Action for Chinese App. No. 202011519176.X dated May 10, 2022, 4 pages.

*Primary Examiner* — Kavel Singh
(74) *Attorney, Agent, or Firm* — Barnes & Thornburg LLP (57) ABSTRACT

The present disclosure relates to a belt as a continuous traction means for conveyor belts of bale presses, comprising at least one fabric layer embedded at least in certain regions in a polymer layer, for creating a continuous belt reinforced by at least one fabric layer.
The present disclosure provide that cross-stiffening elements are embedded in the polymer layer, for increasing a transverse rigidity of the belt, whereby the cross-stiffening elements are essentially oriented in a transverse direction of the belt, and the belt exhibits, at least in the region of the cross-stiffening elements, a ratio of rigidity between the transverse rigidity and a longitudinal rigidity of at least 2:1.

15 Claims, 3 Drawing Sheets

(56) References Cited

U.S. PATENT DOCUMENTS

| | | |
|---|---|---|
| 2008/0153647 A1 | 6/2008 | Muma |
| 2010/0251685 A1 | 10/2010 | Muma |
| 2013/0256101 A1 | 10/2013 | Gentz |

FOREIGN PATENT DOCUMENTS

| | | |
|---|---|---|
| DE | 3808711 A1 | 9/1989 |
| DE | 199318117 U1 | 2/1995 |
| DE | 10037645 A1 | 2/2002 |
| DE | 102004023705 B3 | 10/2005 |
| DE | 102011116633 A1 | 4/2013 |
| DE | 102016112305 A1 | 1/2018 |
| EP | 1136396 A1 | 9/2001 |
| EP | 1595437 A2 | 11/2005 |
| EP | 3078880 A1 | 10/2016 |
| EP | 3210915 A1 | 8/2017 |

\* cited by examiner

BELT AS CONTINUOUS TRACTION MEANS FOR CONVEYOR BELTS OF BALING PRESSES OR BALE WRAPPERS

PRIORITY CLAIM

This application claims priority to European Patent Application No. EP19218795.3, filed Dec. 20, 2019, which is expressly incorporated by reference herein.

BACKGROUND

The present disclosure relates to a belt as a continuous traction means for conveyor belts of bale presses or bale wrappers.

SUMMARY

According to the present disclosure, a belt as a continuous traction means for conveyor belts of bale presses according to the present disclosure is developed in that cross-stiffening elements are embedded in the polymer layer for increasing a transverse rigidity of the belt, whereby the cross-stiffening elements are essentially oriented in a transverse direction of the belt and the belt exhibits, at least in the region of the cross-stiffening elements, a ratio of rigidity between the transverse rigidity and a longitudinal rigidity of at least 2:1.

In illustrative embodiments, the bending stiffness of the belt both in the longitudinal direction and in the transverse direction are taken into consideration and these are set in relation to each other. The bending stiffness of the belt in the area of the cross-stiffening elements may be measured, for example, by way of a 3 point bending test, e.g. in accordance with DIN EN ISO 178, or even by way of a 4 point bending test or similar. This makes it possible, by virtue of appropriately selecting the material and/or the dimensions of the cross-stiffening elements and/or the arrangement thereof in the belt, to attain the stiffness ration according to the present disclosure of larger than or equal to 2:1 (with equivalent effect even still at ~1.8:1), preferably larger than or equal to 3:1, in particular larger than or equal to 5:1. Owing to these rigidity ratios any flipping-over or bending of the highly tensed belt in operation of the baling press can be prevented already, where this can be improved further if rigidity ratios of larger than 5:1, preferably larger than 10:1, are set. Such rigidity ratios can be attained, for example, using cross-stiffening elements having a modulus of elasticity of at least 25 kN/mm$^2$, preferably at least 35 kN/mm$^2$, in particular more than 50 kN/mm$^2$.

In illustrative embodiments, the belt of this type comprising at least one fabric layer which is embedded at least in certain areas in a polymer layer for creating a continuous belt reinforced by at least one fabric layer, is reinforced in the transverse direction in its bending stiffness without thereby significantly affecting the flexibility of the belt in the longitudinal direction (longitudinal (bending) stiffness). This can prevent flipping-over or, respectively, bending over of the highly tensed belt in operation of the baling press, since transverse forces acting on the belt can be effectively compensated by the cross-stiffening elements. To that end, the cross-stiffening elements are preferably distributed across the entire circumference of the belt. Hereby, the cross-stiffening elements may also be arranged in the fabric layer or, respectively, be a part of the fabric layer also embedded in the polymer layer.

Because the longitudinal rigidity or, respectively, the flexibility in the longitudinal direction is not significantly affected by the cross-stiffening elements it is also possible to guarantee that the belt is reliably in contact with the pulleys or drive rollers of a bale press thereby being driven and guided without significant impediment so as to press the straw into bales. This can be achieved even in belts having a rigidity ratio of more than 10:1. This allows wider belts to be manufactures using such cross-stiffening elements while, at the same time, maintaining equal reliability in operation. This allows reducing the number of belts in a bale press thereby reducing assembly efforts.

Therefore, the overall ongoing operation of the bale press can be maximized, whereby such problems involving flipping over or, respectively, bending over in the transverse direction do occur in conventional belts, in particular, due to high loads der in a bale press. Hereby, sudden temporary forces may appear laterally that may lead to a flip-over due to the high tension as well as the speed of the belt. This is prevented by the cross-stiffening elements according to the present disclosure which are embedded in the polymer layer.

In illustrative embodiments, it is also provided that the cross-stiffening elements are embedded in the polymer layer in the longitudinal direction fully circumferentially or, respectively, continuously, or in segments at an element distance with respect to one another, or immediately in contact with one another so that the transverse rigidity of the belt is increased continuously across the entire belt or segment by segment. Thus, the cross-stiffening elements run not necessarily full-faced but are spaced apart or lie next to and in contact with one another, whereby either an arrangement continuous across the entire circumference or an arrangement in segments may be provided. In principle, however, an expanse (anisotropic) layer may be provided across the entire circumference or in segments, by means of which the ratio of rigidity according to the present disclosure can be set.

As a result of this the cross-stiffening elements have no significant effect on the bending of the belt in the longitudinal direction, in particular, maintaining contact with the surfaces curved in the longitudinal direction. Thus, the belt can still be guided flush across rollers of the bale press serving to deflect the belt as well as driving the belt. Thus, the operation of the bale press is not limited in this respect.

In illustrative embodiments, it is provided that the cross-stiffening elements are arranged in the polymer layer within a multiplicity of segments at the element distance with respect to one another. Hereby, for example, one segment may have a segment width of between 50 mm and 100 mm, preferably 75 mm, and adjacent segments are arranged at a segment distance of between 200 mm and 300 mm, preferably 250 mm, with respect to one another, whereby no cross-stiffening elements are arranged in the polymer layer between the segments. More generally, hereby, it may be provided that the segment width and the segment distance have a ration with respect to one another of between 1:6 and 1:2, preferably 1:3.

This allows savings in material and weight because the cross-stiffening elements are embedded in the polymer layer not continuously or, respectively, across the full circumference. Hereby, it was recognized that cross-stiffening is not required across the entire length of the belt because flip-over or, respectively, bend-over in operation occurs only across larger areas. Thus, the several spaced-apart segments are sufficient to create cross-stiffened regions between which flip-over usually does not occur in operation due to the small dimensions. It follows that the cross-stiffening elements can be omitted in these in-between regions.

In illustrative embodiments, it is provided that the cross-stiffening elements are bands oriented in the transverse direction having an element width of between 10 mm and 30 mm, preferably 20 mm, and being arranged at an element distance of between, with respect to one another, and/or are cords oriented in the transverse direction, the cords having a diameter of between 0.2 mm and 2.5 mm, preferably 1 mm, and the cords lying in contact with one another or being spaced apart. Hereby, in general, it may be provided that the element width and the element distance in the case of bands have a ratio of between 1:12 and 1:35, preferably 1:15, with respect to one another.

As a result of this it is possible to provide cross-stiffening elements that can be simply and reliably embedded into the polymer layer and by means of which the rigidity ratios can be attained in a simple manner. These cross-stiffening elements, i.e. both the bands and the cords, may be made, for example, of metal, e.g. spring steel, or of fiber-reinforced plastics, e.g. with fibers of glass or carbon or aramid, or of low stretch textile fibers, or monofil thermoplastic yarns.

Hereby, it may be provided that the cross-stiffening elements are oriented in the polymer layer exactly in the transverse direction or at an angle of between +15° and −15°, preferably between +5° and −5°, with respect to the transverse direction. Hereby, the cross-stiffening elements may be straight or, with equal or comparable effect, also curved and correspondingly oriented in the transverse direction so as to attain the rigidity ratio according to the present disclosure of at least 2:1. Therefore, it is not absolutely necessary to provide an exact orientation in the transverse direction as long as a deflection of the belt about the rollers of the bale press can still be guaranteed, for example, where diameters are large or, respectively, the rigidity ratio according to the present disclosure of larger than or equal to 2:1 is still met.

It is further provided that an edge distance of between 2 mm and 50 mm is provided between the cross-stiffening elements and the margins of the belt. This makes it possible to avoid, in the event of wear of the belt in the margin regions, e.g. upon fraying, that the cross-stiffening elements protrude and may damage or, respectively, injure adjacent elements or persons.

It is further provided that the cross-stiffening elements are omitted in partial regions of the belt, for example, in a middle partial region of the belt. Thereby, advantageously, weight can be saved when partial regions of the belt are constructed without cross-stiffening elements, whereby the omitted partial regions are preferably chosen in such a manner that flip-over in these partial regions is unlikely. For example, flip-over in the transverse direction about the middle partial region (about the central axis) of the belt highly unlikely to happen due to the tension of the belt so that this region can be omitted.

In illustrative embodiments, it is further provided that end regions of the belt are connected to one another for creating a continuous belt, whereby, to that end, the end regions of the belt lie flat upon one another in an overlap region and are joint together at least in certain sections in the overlap region, or the end regions are held together by means of a belt joint. However, it is also possible to utilize a belt that is manufactured already to be endless without joints which is thus used without end regions in which the cross-stiffening elements are embedded.

Thereby, different options are provided for securely joining the belt ends or, respectively, providing a continuous belt. Hereby, depending on the construction of the joint, the cross-stiffening elements may even contribute to an improved tensile strength. On the other hand, it may be provided that the cross-stiffening elements are omitted in the end regions so as not to hinder or disturb the joining process.

It is provided that the end regions, if there are any, are connected to one another by a thread creating at least one seam, where, to that end, the at least one thread penetrates the end regions of the belt in a seam region in several stitches, whereby the at least one fabric layer of the belt is embedded in the polymer layer at least across the seam region, and the thread is embedded in the polymer layer in transition regions between the stitches close to the surface at a depth of penetration, in such a way that the thread runs completely or, respectively, for the most part, below surfaces of the belt or, respectively, does not protrude from the belt beyond the surface.

It is further provided that a majority of the transition regions between the stitches comprise a direction component which is oriented parallel to a longitudinal direction of the belt and/or in addition at least one assembly seam is provided extending in the seam regions essentially transverse to a longitudinal direction of the belt, the main direction component of the at least one assembly seam preferably extending at an angle of more than 45° with respect to the longitudinal direction of the belt, preferably about 60° with respect to the longitudinal direction of the belt.

The orientation in the longitudinal direction of the belt allows the tensile load on the belt to be efficiently deviated by the thread. The thread preferably conveys the tensile load and possibly further forces into the fabric layer which is penetrated by the stitches at several crossing points by the thread. This can guarantee a particularly high tensile strength of the endless joined belt as well as a high durability of the belt connection.

The assembly seam serves to press the belt ends against the surface of the belt so as to prevent any fold-over of the end regions emanating from the belt ends. This allows for a permanently constant operation of the belt and for preventing or, respectively, delaying ripping of the belt connection caused by fold-over of the end regions.

In addition or in the alternative, this may also be achieved in that the seam region goes beyond the overlap region at least on one side so that stitches and transition regions of the thread are also located outside the overlap region for pressing-on belt ends of the belt to the surface of the belt. Thus, the seam has to be guided merely across the overlap region thereby simplifying the pressing-on of the belt ends because no further seam is required.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
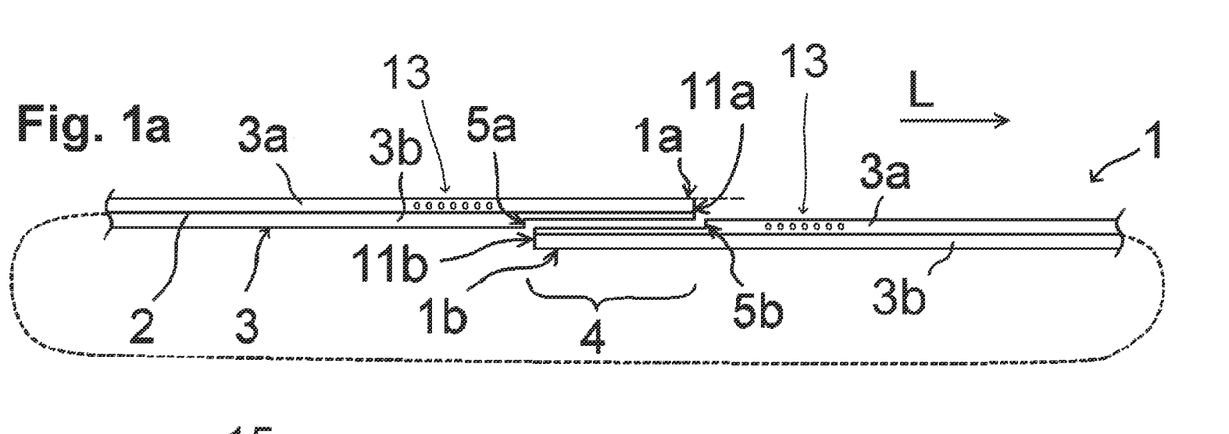
FIG. 1a is a longitudinal section through a belt according to the present disclosure.

The belt 1 shown in FIG. 1a in a sectional view can be utilized as a traction means for conveyor belts in a bale forming device of a bale press or in bale wrappers thereby circulating therein on several pulleys and a drive roller (not shown). To that end, the belt 1 is joined at its end regions 1a, 1b so as to form a continuous belt 1 which can be mounted e.g. on the rollers of a conveyor device of an agricultural machine. The belt 1 consists at least in part of a fabric layer reinforced cross-linked polymer thereby including at least one reinforcing fabric layer 2 which is embedded at least in certain regions in a polymer layer 3, in particular rubber layer. Thus, the fabric layer 2 is covered at least in certain regions from above and below by the polymer layer 3 as polymer surface material. Possibly, other or additional layers and/or polymer coatings may be provided as polymer surface material.

Figure 1B:
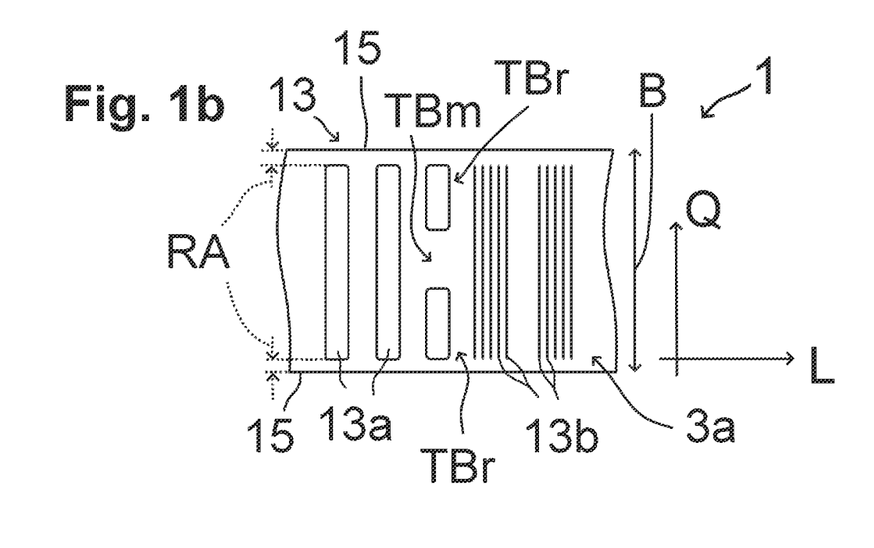
FIG. 1b a top view on the belt according to the present disclosure according to FIG. 1.

According to FIG. 1a as well as the top view in FIG. 1b it is further provided that several cross-stiffening elements 13 are provided in an external surface layer 3a of the polymer layer 3, i.e. the part of the polymer layer 3 that lies above the fabric layer 2 of the belt 1 in FIG. 1a. As shown in FIG. 1b, these are oriented in a transverse direction Q of the belt 1. The cross-stiffening elements 13 are, for example, characterized in that they exhibit a modulus of elasticity E of >25 kN/mm$^2$, preferably >35 kN/mm$^2$, in particular >50 kN/mm$^2$ providing for a high bending stiffness in the transverse direction Q (transverse rigidity QS). To that end, the cross-stiffening elements 13 are made, for example, of metal, e.g. spring steel, or of fiber-reinforced plastics, e.g. with fibers of glass or carbon or aramid, or of textile fibers, or monofil thermoplastic yarns.

This additionally (bending) stiffens the belt 1 in the transverse direction Q, i.e. elastic deformation or, respectively, bending over in the transverse direction Q is impeded, whereby a flip-over or, respectively, ben-over of the belt 1 about an axis running parallel to a longitudinal direction L of the belt 1 is avoided or, respectively, will not occur until very high transverse forces are applied. In case of a particularly wide belt 1 this blocks that this belt flips over, during normal operation in a bale press, from the edge in the direction towards the center of the belt thereby having an interruption of the operation to flip back the belt 1.

Since the cross-stiffening elements 13 are oriented essentially in the transverse direction Q a stiffening is caused merely in this direction and not in the longitudinal direction L. This does not impede operations because deflection of the belt 1 at the pulley or, respectively, the drive roller is not compromised. This is supported by the fact that the cross-stiffening elements 13 in the longitudinal direction L are preferably not continuous.

Figure 2A:
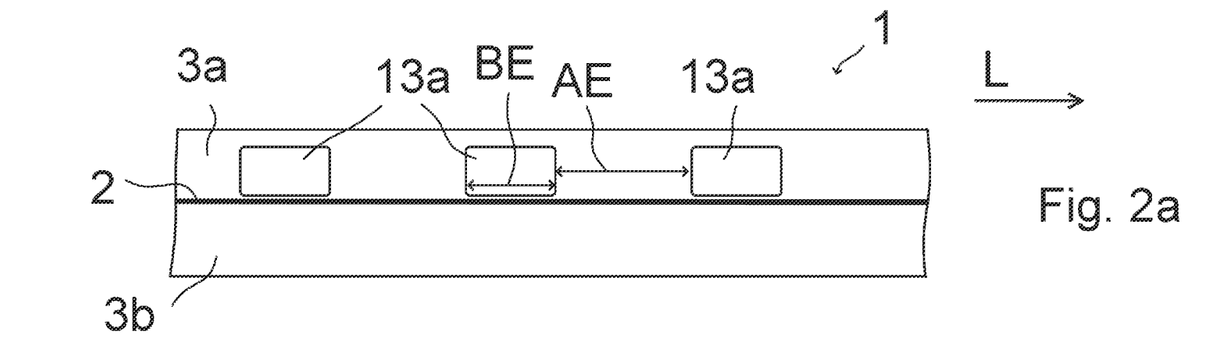
FIGS. 2a, 2b, 2c are detailed views of the belt according to the present disclosure in different embodiments.
Figures 2B, 2C:
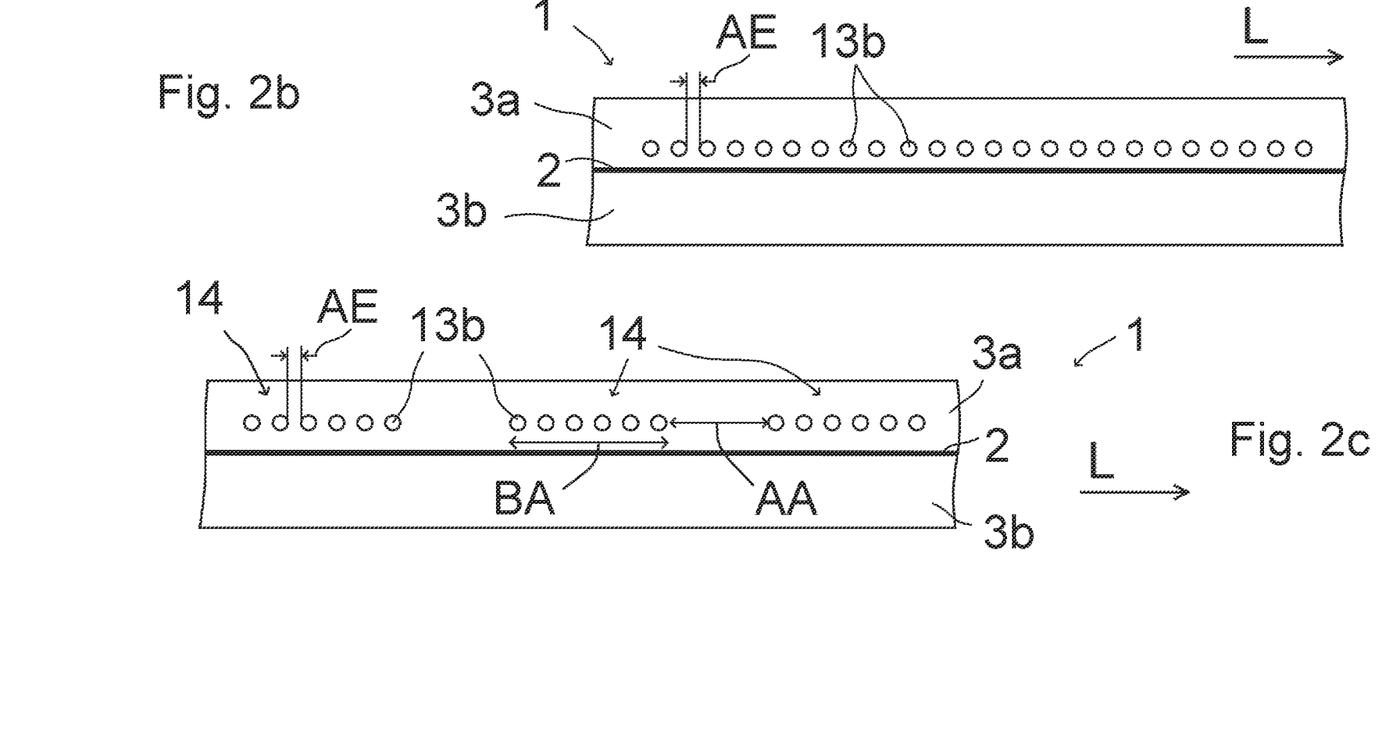

To that end, according to the detailed view in FIG. 2a which is not to scale, it is provided, for example, that the cross-stiffening elements 13 are constructed as bands 13a spaced-apart in the longitudinal direction L, for example steel bands, or according to the detailed view in FIGS. 2b and 2c which is not to scale, as cords 13b spaced-apart in the longitudinal direction L, for example steel cords. Thus, the cross-stiffening elements 13 are arranged in the longitudinal direction L of the belt 1 fully circumferential or, respectively, continuously or section by section at even distances AE with respect to one another. Given an element width BE of. For example, between 10 mm and 30 mm, preferably 20 mm, the bands 13a may be arranged at an element distance AE of between 250 mm and 350 mm, in particular 300 mm, Given a diameter of, for example, between 0.2 mm and 2.5 mm, preferably 1 mm, the cords 13b, however, may be either in contact with one another or spaced-apart.

Moreover, according to FIG. 2c, the cords 13b may be combined into fixed segments 14, the segments 14 being distributed at segment distances AA across the belt 1 evenly and across the entire circumference. The segment distances AA may be, for example, between 200 mm and 300 mm, preferably 250 mm. A segment 14 may exhibit a segment width BA of between 50 mm and 100 mm, preferably 75 mm.

Such an arrangement does not significantly affect the bendability of the belt 1 or, respectively, its flexibility in the longitudinal direction L so that the belt 1 may still lie flush on the pulleys and the drive roller when being deflected and the running properties and drive properties of the belt 1 being not significantly compromised. In order to guarantee this the cross stiffening elements 13 are designed and arrange in the belt 1 in such a way that a ratio of rigidity QS/LS between the transverse (bending) stiffness QS of the belt 1 and a longitudinal (bending) stiffness LS amounts to at least 2:1, preferably at least 3:1, in particular at least 5:1. However, the ratio of rigidity QS/LS may even amount to at least 10:1.

As shown schematically in FIG. 1b, the cross stiffening elements 13 end on both sides at an edge distance AR away from the margins 15 of the belt 1, where the edge distance AR is, for example, between 2 mm and 50 mm. This serves to prevent the cross stiffening elements 13, in the event of wear on the margins of the belt 1 or, respectively, of fraying, from protruding from the margins of the belt 1 thereby avoiding damage to other components or injury of persons.

In addition, it may be provided that the cross stiffening elements 13 are omitted in partial regions TB, in particular in a middle partial region TBm, as shown in FIG. 1b by way of example. Thus, the cross stiffening elements 13 do not extend across the entire belt width B—minus the edge distances AR—of the belt 1. This allows savings in material and weight. Hereby, it is also taken into consideration that, in the case of a wide belt 1, flipping-over of the belt 1 about an axis extending in the longitudinal direction L happens only in partial regions TBr of the belt 1 near the margins.

Instead of an arrangement of the cross-stiffening elements 13 in the exterior surface layer 3a of the polymer layer 3, as represented in the FIGS. 1a, 1b, 2a, 2b, 2c, these may also be arranged similarly in an interior surface layer 3b (not shown). This will result in the same advantages described above.

Figure 3:
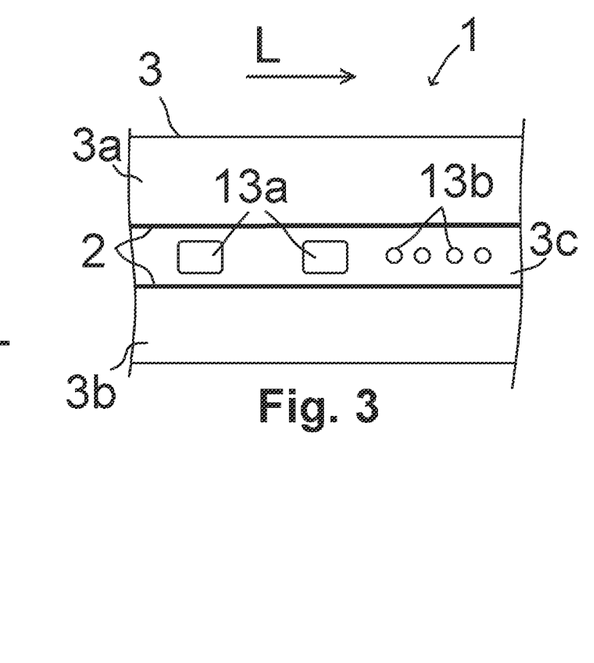
FIG. 3 is a further embodiment of the belt according to the present disclosure.

Further, as shown in FIG. 3, a belt 1 with two fabric layers 2 is also possible, the layers being embedded in a polymer layer 3 spaced apart, where the polymer layer 3 consists of an exterior and an interior surface layer 3a, 3b as well as an intermediate layer 3c. Then, the cross stiffening elements 13 between the two fabric layers 2 in the intermediate layer 3c, as describe d above, may be constructed as bands 13a (compare FIG. 2a) and/or cords 13b (compare FIG. 2b, 2c), oriented in the transverse direction Q. The arrangement of the cross-stiffening elements 13 in the longitudinal direction L may be chosen identically as the above-described embodiment of the belt 1 with only one fabric layer 2. In principle, the cross stiffening elements 13 in this embodiment may also be arranged inside one of the surface layers 3a, 3b. Furthermore, in principle, more than two fabric layers 2 with corresponding surface layers 3a, 3b may be provided which will then comprise several intermediate layers 3a.

In order to make a continuous belt 1 such cross stiffening elements 13 of this type, several options are provided. Thus belts 1 comprising the cross stiffening elements 13 in a correspondingly described form may first be cut and subsequently the belt ends 11a, 11b joint securely and durable at their end regions 1a, 1b using a subsequently mounted belt lock. Hereby, the belt lock receives the end regions 1a, 1b thereby forming a durably closed connection or, respectively, transition piece which is also capable of absorbing tensile forces of the belt 1. In principle, it is also possible to provide a belt 1 that has been pre-manufactured to be continuous.

Figure 4:
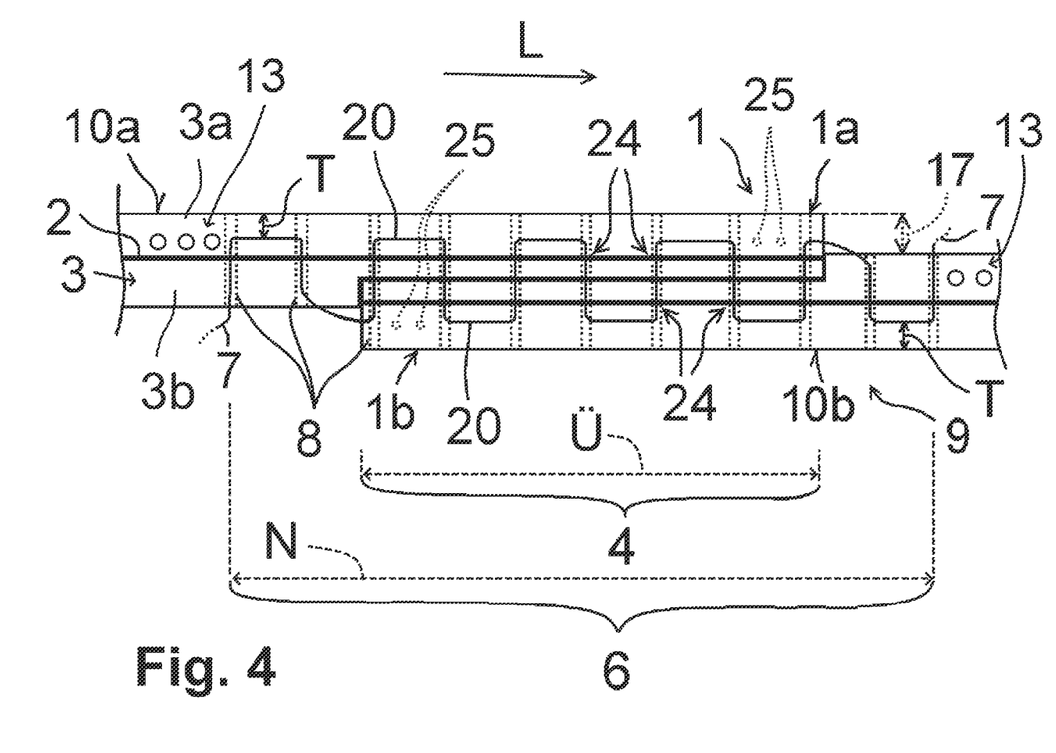
FIG. 4 is a detailed view with a sewn connection of the belt according to FIG. 1.

Further, a connection is also possible in which the two end regions 1a, 1b are joined directly, for example, by means of sewing, gluing, screwing, riveting, vulcanizing, etc. to that end, firstly, it is provided to place the end regions 1a, 1b of the belt 1 in an overlap region 4 flatly on top of one another. According to FIG. 1a or FIG. 4, hereby, the end regions 1a, 1b are oppositely graduated, whereby, to that end, the interior surface layer 3b of the polymer layer 3 is ablated at least in part at an end region 1a and the exterior surface layer 3a of the polymer layer 3 at the other end region 1b thereby forming a step 5a, 5b each. By virtue of this measure an overhang 17 (s. FIG. 4) in overlap region 4 can be reduced, thus improving the operation of the belt 1 as well as its durability. In principle, however, a step-less overlap may be provided. In addition, the making of a flat surface substance-to-substance bond in the area of the steps 5a, 5b between the end regions 1a, 1b may be provided via an arbitrary bonding agent or an non-vulcanized polymer layer arranged between the end regions 1a, 1b which is cross-linked after sewing. Depending on the application, the additional non-vulcanized polymer layer arranged between the end regions 1a, 1b may even remain non-cross-linked.

In accordance with one embodiment, shown in FIG. 4, the end regions 1a, 1b of the belt 1 placed on top of one another are subsequently sewn in a seam region 6 using at least one thread 7, where, to that end, the thread 7 penetrates, in particular, the two end regions 1a, 1b in several stitches 8. Hereby, one seam 9 per thread 7 is created with a certain seam shape, FIG. 4 showing an exemplary sectional view along such a seam 9. In order to allow such and endlessly joined belt 1 to operate continuously under high tensile loads, the tread 7 is introduced into the seam region 6 under consideration of the following aspects:

In order to limit in operation of the belt 1 the thread 7 being worn causing it to tear at some point due to continuous load, e.g. by pressure and/or friction with the crop conveyed as well as the pulleys or, respectively, drive roller or other components in contact (depending on the application), the thread 7 is embedded in transition regions 20 between the individual stitches 8 in the polymer layer 3 of the respective end region 1a, 1b, as shown schematically in FIG. 4.

Hereby, embedded shall mean that the thread 7, even in the transition regions 20 between the stitches 8, preferably lies completely below the surfaces 10a, 10b of the polymer layer 3 or, respectively, does not protrude beyond these from the belt 1. Thus, the thread 7 penetrates the belt 1 or, respectively, its surface 10a, 10b, with a certain depth of penetration T. This can guarantee that the belt 1 is in contact with the rollers or, respectively, the crop or, respectively, the corresponding application specific component mainly with its surfaces 10a, 10b and the embedded thread 7, depending on the depth of penetration T in der polymer layer 3, is not stressed or at least less severely stressed and, thereby, protected.

In order for the cross stiffening elements 13 to not prevent or, respectively, disturb this embedding of the thread 7 it may be provided that the cross stiffening elements 13 in the interior or the exterior surface layer 3a, 3b are completely omitted in the overlap region 4 or in the seam region 6. If, for example, rods 13a are used as cross-stiffening elements 13, this may already simplify the sewing process because the sewing needle cannot penetrate the rods 13a and, thus, the needle 9 cannot run in the area of the rods 13a but has to be positioned correspondingly adjacent thereto.

In case of the cords 13b, on the other hand, due to the small diameter of the cords 13b, the sewing needle will be deflected sideways by them so that the seam 9 may, in principle, also positioned above them or in the respective area. However, in order to enable embedding of the thread 7, the cords 13b should be embedded, at least in the same region 6, so deeply into the respective surface layer 3a, 3b that a distance above the cords 13b corresponding to the depth of penetration T to the respective surface 10a, 10b is maintained. On the other hand, the cords 13b, too, may be omitted completely in the overlap region 4 or, respectively, in the seam region 6.

If the belt 1 has further polymer layers and/or polymer coatings besides the polymer layer 3 on the surface, then the thread 7 is correspondingly embedded in these, i.e. extends correspondingly at a depth of penetration T below the surfaces of these further layers or, respectively, does not protrude beyond these from the belt 1.

The embedding of the thread 7 into the surfaces 10a, 10b of the belt 1 is facilitated by the polymer layer 3 provided on the surface at least in the seam region 6, whereby the polymer layer 3 should to be too hard so that the thread 7 may become immersed therein. At the same time, however, the polymer layer 3 should not be too soft so that forces acting on the belt 1 are not transmitted or transmitted only in a much attenuated manner to the thread 7 and the polymer layer 3 does not wear out too quickly in operation thereby exposing the thread 7.

The embedding of the thread 7 into the polymer layer 3 in the seam region 6 can be attained, for example, in that upon making the seam 9 in a sewing process a certain thread tension is applied so that the thread 7 in the transition regions 20 between the stitches 8 is pressed into the polymer material of the polymer layer 3 thereby deforming this in such a way that are recess is formed having the depth of penetration T. This can even be enhanced in operation of the belt 1 when a tensile tension acts on the belt 1 that also increases the thread tension of the thread 7. This draws the thread 7 even deeper into the polymer material while deforming the polymer layer 3; thus, the depth of penetration T increases, preferably until the thread 7 reaches the cross stiffening elements 13, in particular the cords 13b.

Thereby, the thread 7 approaches the fabric layer 2 or the cross stiffening elements 13 more and more, however, without touching these, making it possible to protect the thread 7 even more. Because there is still the elastic polymer material between the fabric layer 2 or, respectively, the cross-stiffening element 13 and the thread 7, it is possible to attain a certain shock elasticity in operation of the belt 1 because the thread 7 is pressed into the elastic polymer material in the event of sudden tensile stress on the belt 1. This dampens the jerk on the thread 7, thereby protecting this from tearing.

To further simplify the penetration into the polymer layer 3 it may be provided that the surfaces 10a, 10b of the polymer layer 3 at least in the seam region 6 are structured or, respectively, exhibit a certain roughness and, therewith, small irregularities already. Hereby, it is sufficient to structure the polymer layer 3 merely in the seam region 6. This enables the thread 7 to become immersed in the polymer layer 3 by virtue of a smaller force or, respectively, a lower thread tension already because the recess for the thread 7 is then formed also by the irregularities already present. In addition, in operation of the belt 1 the thread 7 is drawn, given the same tensile tension on the belt 1, less strongly into the polymer layer 3 afterwards than with unstructured surfaces 10a, 10b. Thereby, a later loosening of the thread 7 can be avoided. In principle, it may also be provided to form the recess for the thread 7 in advance by introducing a corresponding profile into the surfaces 10a, 10b, along which the seam 9 is then formed.

Alternatively, it may also be provided to finally embed the thread 7 into the polymer layer 3 only after sewing. To that end, it may be provided, for example, that the respective surface layer 3a, 3b of the polymer layer 3 of a provided belt 1, at least in the respective end region 1a, 1b or, respectively, in the seam region 6, is abraded at least in part prior to sewing, preferably without exposing the cross stiffening elements 13, and, after sewing the end regions 1a, 1b, a non-cross-linked polymer layer is again added on top, at least in the seam region 6, as surface layer 3a, 3b so that the seam 9 is completely covered thereby. This non-cross-linked polymer layer is cross-linked or, respectively, vulcanized subsequent to the sewing process so that this becomes part of the belt 1, thereby contributing to embedding the fabric layer 2 in certain areas and the thread 7 is also being embedded therein. Thus, with the method, the thread 7 will not be embedded in the polymer layer 3 of the belt 1 until after sewing.

Thus, by virtue of the above-described methods of embedding the thread 7 in the polymer layer 3, it is possible to protect the thread 7. This minimizes that the thread 7 wears off too quickly in continuous operation of the belt 1 or, respectively, individual regions of the thread 7 tears caused by loads, in particular friction, emanating from the rollers or, respectively, the crop or, respectively, the respectively contacting application specific components, and the continuous belt 1 becomes undone because of the load in the area of the belt connection after a while.

Instead of using merely one embedded thread 7, it is also possible to utilize two or more embedded threads 7 each of which will then form a seam 9 according to the above description.

In order to maximize high tensile strength of the belt 1 in operation even with this belt connection, each seam 9 is constructed in such a manner that the thread 7 exhibits a direction component in the transition region 20 between the stitches 8 extending in or, respectively, parallel to the longitudinal direction L of the continuous belt 1. This is the case, for example, in a seam 9 having a zigzag path or a wavelike path or a rectangular path. Thereby, the thread 7 is oriented in the transition regions 20 at least in part in the main stress direction of the belt 1, preferably in a direction of tensile load so that a major part of the tensile forces in the area of the belt connection can be absorbed by the thread 7 embedded therein. This can even be improved in that the thread 7, for example, rests against the sides of the cords 13b as cross-stiffening elements 13, thereby allowing for a further improvement of the tensile strength because the cords 13b themselves can absorb a part of the tensile load on the threads 7.

Thus, the collaboration of the embedding of the thread 7 in the polymer layer 3, the partial orientation of the thread 7 or, respectively, the seam 9 in the longitudinal direction L as well as the optional measure of having the thread 7 lie in contact with the cross stiffening elements 13; 13b guarantees a particularly high tensile strength of the belt 1 even in the area of the belt connection which can be maintained for a long period of time. In particular, the selection of the fabric in der fabric layer 2 may also contribute hereto.

Figure 5:
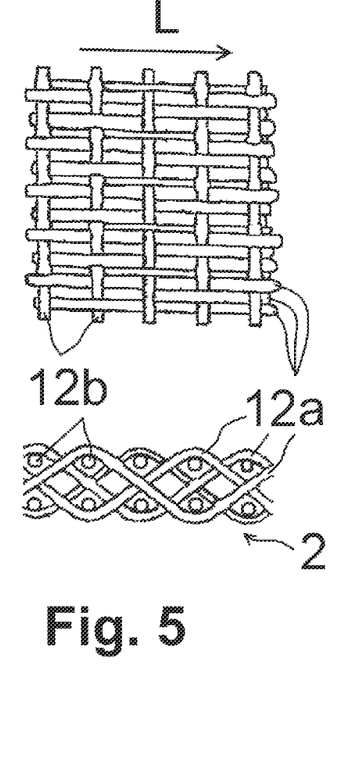
FIG. 5 is a detailed view of the fabric layer utilized.

Hereby, the reinforcing fabric layer 2 is preferably constructed as a so-called SZ fabrics made from twisted warp threads 12a and weft threads 12b (s. FIG. 5), such an SZ fabric being described, by way of example, in the document EP 0 213 219 A1, the contents of which is hereby fully incorporated by reference into the present application. An SZ fabric of this type is characterized in that adjacent, warp threads 12a, each twisted, extending preferably in the longitudinal direction L of the belt 1, exhibit different directions of rotation of the twisting. Thereby, essentially one half of the warp threads 12a have one direction of rotation while the other, remaining warp threads 12a exhibit the opposite direction of rotation. Thus, warp threads 12a are used that are being twisted in different directions when manufactured or, respectively, when twisted, where, expediently, consistent numbers of revolution are applied to the threads. Preferably, oppositely twisted warp threads 12a may be combined in pairs and surrounded in pairs by the weft threads 12b (not shown in FIG. 5), thereby attaining a particularly advantageous mutual balancing effect of the adjacent warp threads 12a so that a very high tensile strength of the belt 1 can be guaranteed already. Moreover, the SZ fabric can also guarantee an improved directional stability of the belt 1.

Because the thread 7 penetrates this SZ fabric in several stitches 8 it is also possible to deflect the tensile load on the thread 7 efficiently into the fabric layer 2 thereby maintaining a high tensile strength of the belt 1 even across the belt connection. Hereby, however, it should be ensured that the fabric layer 2 is not overly perforated by the stitches 8, i.e. the stitching pitch is not too small, preferably wider than 2 mm, and the stitch density is not chosen too high because otherwise the overall tensile strength of the belt 1 will be strongly reduced.

In addition, this SZ fabric according to FIG. 5 may be constructed in a double cloth structure, whereby the weft threads 12b in this double cloth structure are arranged in pairs lying on top of one another (in the direction of penetration of the stitches 8) and the warp threads 12a are interlaced with the weft threads 12b, as shown in FIG. 5. This allows the density of the twisted threads and thereby the tensile strength of the belt 1 as such to be increased. In a combination of this double cloth structure with the above-described SZ fabric each warp thread 12a shown is replaced by two warp threads 12a running in parallel and being oppositely twisted.

By virtue of the embodiment with weft threads 12b in pairs lying on top of one another (double cloth) it is possible to attain, besides the high tensile strength, also a particularly high pull-out strength of the thread 7. This is because the thread 7 penetrates (stitch 8) the interlaced warp threads 12a and weft threads 12b of a fabric layer 2 in the seam region 6 in several places at crossing points 24 (FIG. 4). Thus, the thread 7 is clamped per fabric layer 2 on both sides in a certain area by the warp threads 12a and the weft threads 12b. Thereby, tensile loads acting on the thread 7 are deflected to the fabric layer 2 even more efficiently. Since the thread 7 according to FIG. 4 penetrates two fabric layers 2 (of the two end regions 1a, 1b) in the overlap region 4, this effect is enhanced even more so that the tensile strength of the entire belt 1 can be further improved even across the belt connection.

Depending on the embodiment and the field of application of the belt 1, a seam length N of the seam region 6 and/or an overlap length U of the overlap region 4 may be adapted. Hereby, it may be provided for the seam region 6 to be larger than the overlap region 4 and/or protrudes beyond it at least on one side. Thereby, the seams 9 will extend even into a small area next to the belt ends 11a, 11b of the belt 1. In this case, the belt ends 11a, 11b will be pressed by the seam 9 towards the surfaces 10a, 10b of the polymer layer 3 so that any flip-over of the end regions 1a, 1b emanating from the belt ends 11a, 11b can be advantageously suppressed. This results in constantly consistent running properties of the belt 1 and any tearing of the bel connection by the end regions 1a, 1b bending over can be avoided or, respectively, delayed.

In addition or in the alternative, one or more assembly seams 25 may be provided which, as indicated in FIG. 4, run transverse to the longitudinal direction L and serve to press on the belt ends 11a, 11b as well as to absorb a part of the tensile forces. Hereby, the angle of the assembly seams 25 with respect to the longitudinal direction L is preferably between 45° and 90°, preferably 60°.

A comparative belt relating to a machine for picking up and pressing agricultural crop, e.g. hay or straw. This machine is provided with a bale conveyor comprising two parallel spaced-apart belts interconnected via transverse rods spaced apart from each other in parallel. The comparative belts are made of a plastics material or of rubber and are reinforced by at least one layer of fabric. Comparative belts of this type usually exhibit a ratio of rigidity between a transverse rigidity and a longitudinal rigidity of 1.3:1 or less.

A comparative continuous belt may be made from an elastomer material. It is used, likewise, in baling presses and is reinforced by a winding element made of steel cord extending in the longitudinal direction of the belt and being embedded in a rubber matrix. In addition to this winding element a further steel cord reinforcement is provided which is oriented perpendicular to the longitudinal direction of the comparative belt. This makes the bending stiffness about identical for both directions. In the baling press these comparative belts are arranged in a multiplicity next to each other and act directly on the crop to be shaped into bales.

It is a disadvantage with such comparative belts of a bale press running side by side that the process of mounting the multiplicity of belts is very complex and the belts may know against one another in operation thereby disturbing the operation. Moreover, there is loss of material because the straw to be pressed may pass through gaps between the multiplicity of comparative belts. If the number of comparative belts running side by side is reduced, for example to two of the three comparative belts, the width of the comparative belts should be chosen correspondingly wider in order to cover the same surface in the bale press. This, however, may lead to lateral flip-over of the so widened comparative belts in operation, for example due to an asymmetric load or due to forces induced abruptly or suddenly acting on the highly tensioned comparative belts from the side. This, too, will disturb running operations.

Moreover, for their use the belts are an endless shape. For creating such a continuous shape several methods may be suitable.

Two ends of a comparative belt may be interlocked in a comb-shaped manner and, in order to make the belt endless, to slide the interlocking regions into one another and to vulcanize them. Metal fittings may be affixed to both belt ends that are designed essentially u-shaped and are alternatingly arranged on the belt ends. The legs of the fittings embrace the belt end between themselves with compression and are fastened by rivets extending through the belt ends. The essentially semicircular bars of the fittings connecting the legs are in alternating contact with a rod that extends across the entire width of the belt ends and is inserted upon assembly of the belt and is pulled out for disassembly of the belt. The rod consists of a suitable material, however, it may also be designed as a strong wire rope. This design bears the disadvantage that the fittings wear over time in the region of the semicircular bars by friction with the rod making it necessary to replace the belt.

A comparative tension means designed as a cam belt is made continuous by means of a belt lock. Belt locks of this type are frequently used in various embodiments for making tension means endless tension means for conveyor belts of agricultural machines.

A comparative flat belt as tension means may be made from fabric layer reinforced polymer. This comparative belt is made continuous in that it is graded multiple times at both ends across the entire width. This creates an area of overlap in which a first end region of the belt and a first end region of the belt lie on top of one another in an overlapping manner. At its underside the belt is provided with grooves arranged evenly spaced and extending perpendicular to the longitudinal direction, which serve to receive anchor plates in the overlap regions. Each anchor plate comprises two welded-on and spaced-apart screw bolts. When the belt ends are placed on top of one another, these screw bolts penetrate holes provided in the belt ends and aligned with each other. Nuts are screwed onto the ends of the screw bolts protruding from the belts and tightened firmly, thereby pressing the belt ends firmly together to allow tensile forces to be transmitted.

A comparative belt as endless traction means of conveyor belts of bale presses or bale wrappers, comprising at least one fabric layer which, at least in certain regions, is embedded in a polymer layer, for creating an endless belt reinforced by at least one fabric layer. Further, transverse cords are arranged in the belts which reinforce the belt and serve to hold the longitudinal cords together.

A disadvantage of such comparative belt connections is that their creation is complex and they can generate disturbing noise in operation in that metal components in the area of the belt joint impact other components, e.g. toothed wheels or roller or similar.

Therefore, the present disclosure provides a belt which has a high degree of tensile strength and can guarantee a durable or, respectively, undisturbed operation.

This task is solved according to the present disclosure by a belt exhibiting the features of claim 1. Preferred further developments are specified in the sub-claims.

Accordingly, a belt as a continuous traction means for conveyor belts of bale presses according to the present disclosure is developed in that cross-stiffening elements are embedded in the polymer layer for increasing a transverse rigidity of the belt, whereby the cross-stiffening elements are essentially oriented in a transverse direction of the belt and the belt exhibits, at least in the region of the cross-stiffening elements, a ratio of rigidity between the transverse rigidity and a longitudinal rigidity of at least 2:1.

Hereby, according to the present disclosure, the bending stiffness of the belt both in the longitudinal direction and in the transverse direction are taken into consideration and these are set in relation to each other. The bending stiffness of the belt in the area of the cross-stiffening elements may be measured, for example, by way of a 3 point bending test, e.g. in accordance with DIN EN ISO 178, or even by way of a 4 point bending test or similar. This makes it possible, by virtue of appropriately selecting the material and/or the dimensions of the cross-stiffening elements and/or the arrangement thereof in the belt, to attain the stiffness ration according to the present disclosure of larger than or equal to 2:1 (with equivalent effect even still at −1.8:1), preferably larger than or equal to 3:1, in particular larger than or equal to 5:1. Owing to these rigidity ratios any flipping-over or bending of the highly tensed belt in operation of the baling press can be prevented already, where this can be improved further if rigidity ratios of larger than 5:1, preferably larger than 10:1, are set. Such rigidity ratios can be attained, for example, using cross-stiffening elements having a modulus of elasticity of at least 25 kN/mm$^2$, preferably at least 35 kN/mm$^2$, in particular more than 50 kN/mm$^2$.

Thus, the belt of this type comprising at least one fabric layer which is embedded at least in certain areas in a polymer layer for creating a continuous belt reinforced by at least one fabric layer, is reinforced in the transverse direction in its bending stiffness without thereby significantly affecting the flexibility of the belt in the longitudinal direction (longitudinal (bending) stiffness). This can prevent flipping-over or, respectively, bending over of the highly tensed belt in operation of the baling press, since transverse forces acting on the belt can be effectively compensated by the cross-stiffening elements. To that end, the cross-stiffening elements are preferably distributed across the entire circumference of the belt. Hereby, the cross-stiffening elements may also be arranged in the fabric layer or, respectively, be a part of the fabric layer also embedded in the polymer layer.

Because the longitudinal rigidity or, respectively, the flexibility in the longitudinal direction is not significantly affected by the cross-stiffening elements it is also possible to guarantee that the belt is reliably in contact with the pulleys or drive rollers of a bale press thereby being driven and guided without significant impediment so as to press the straw into bales. This can be achieved even in belts having a rigidity ratio of more than 10:1. This allows wider belts to be manufactures using such cross-stiffening elements while, at the same time, maintaining equal reliability in operation. This allows reducing the number of belts in a bale press thereby reducing assembly efforts.

Therefore, the overall ongoing operation of the bale press can be optimized, whereby such problems involving flipping over or, respectively, bending over in the transverse direction do occur in conventional belts, in particular, due to high loads der in a bale press. Hereby, sudden temporary forces may appear laterally that may lead to a flip-over due to the high tension as well as the speed of the belt. This is prevented by the cross-stiffening elements according to the present disclosure which are embedded in the polymer layer.

Moreover, it is also provided that the cross-stiffening elements are embedded in the polymer layer in the longitudinal direction fully circumferentially or, respectively, continuously, or in segments at an element distance with respect to one another, or immediately in contact with one another so that the transverse rigidity of the belt is increased continuously across the entire belt or segment by segment. Thus, the cross-stiffening elements run not necessarily full-faced but are spaced apart or lie next to and in contact with one another, whereby either an arrangement continuous across the entire circumference or an arrangement in segments may be provided. In principle, however, an expanse (anisotropic) layer may be provided across the entire circumference or in segments, by means of which the ratio of rigidity according to the present disclosure can be set.

As a result of this the cross-stiffening elements have no significant effect on the bending of the belt in the longitudinal direction, in particular, maintaining contact with the surfaces curved in the longitudinal direction. Thus, the belt can still be guided flush across rollers of the bale press serving to deflect the belt as well as driving the belt. Thus, the operation of the bale press is not limited in this respect.

Preferably, it is provided that the cross-stiffening elements are arranged in the polymer layer within a multiplicity of segments at the element distance with respect to one another. Hereby, for example, one segment may have a segment width of between 50 mm and 100 mm, preferably 75 mm, and adjacent segments are arranged at a segment distance of between 200 mm and 300 mm, preferably 250 mm, with respect to one another, whereby no cross-stiffening elements are arranged in the polymer layer between the segments. More generally, hereby, it may be provided that the segment width and the segment distance have a ration with respect to one another of between 1:6 and 1:2, preferably 1:3.

This allows savings in material and weight because the cross-stiffening elements are embedded in the polymer layer not continuously or, respectively, across the full circumference. Hereby, it was recognized that cross-stiffening is not required across the entire length of the belt because flip-over or, respectively, bend-over in operation occurs only across larger areas. Thus, the several spaced-apart segments are sufficient to create cross-stiffened regions between which flip-over usually does not occur in operation due to the small dimensions. It follows that the cross-stiffening elements can be omitted in these in-between regions.

Further, it is provided that the cross-stiffening elements
are bands oriented in the transverse direction having an element width of between 10 mm and 30 mm, preferably 20 mm, and being arranged at an element distance of between, with respect to one another, and/or
are cords oriented in the transverse direction, the cords having a diameter of between 0.2 mm and 2.5 mm, preferably 1 mm, and the cords lying in contact with one another or being spaced apart. Hereby, in general, it may be provided that the element width and the element distance in the case of bands have a ratio of between 1:12 and 1:35, preferably 1:15, with respect to one another.

As a result of this it is possible to provide cross-stiffening elements that can be simply and reliably embedded into the polymer layer and by means of which the rigidity ratios can be attained in a simple manner. These cross-stiffening elements, i.e. both the bands and the cords, may be made, for example, of metal, e.g. spring steel, or of fiber-reinforced plastics, e.g. with fibers of glass or carbon or aramid, or of low stretch textile fibers, or monofil thermoplastic yarns.

Hereby, it may be provided that the cross-stiffening elements are oriented in the polymer layer exactly in the transverse direction or at an angle of between +15° and −15°, preferably between +5° and −5°, with respect to the transverse direction. Hereby, the cross-stiffening elements may be straight or, with equal or comparable effect, also curved and correspondingly oriented in the transverse direction so as to attain the rigidity ratio according to the present disclosure of at least 2:1. Therefore, it is not an absolutely necessary to provide an exact orientation in the transverse direction as long as a deflection of the belt about the rollers of the bale press can still be guaranteed, for example where diameters are large or, respectively, the rigidity ratio according to the present disclosure of larger than or equal to 2:1 is still met.

It is further provided that an edge distance of between 2 mm and 50 mm is provided between the cross-stiffening elements and the margins of the belt. This makes it possible to avoid, in the event of wear of the belt in the margin regions, e.g. upon fraying, that the cross-stiffening elements protrude and may damage or, respectively, injure adjacent elements or persons.

It is further provided that the cross-stiffening elements are omitted in partial regions of the belt, for example, in a middle partial region of the belt. Thereby, advantageously, weight can be saved when partial regions of the belt are constructed without cross-stiffening elements, whereby the omitted partial regions are preferably chosen in such a manner that flip-over in these partial regions is unlikely. For example, flip-over in the transverse direction about the middle partial region (about the central axis) of the belt highly unlikely to happen due to the tension of the belt so that this region can be omitted.

It is further provided that end regions of the belt are connected to one another for creating a continuous belt, whereby, to that end, the end regions of the belt lie flat upon one another in an overlap region and are joint together at least in certain sections in the overlap region, or the end regions are held together by means of a belt joint. However, it is also possible to utilize a belt that is manufactured already to be endless without joints which is thus used without end regions in which the cross-stiffening elements are embedded.

Thereby, different options are provided for securely joining the belt ends or, respectively, providing a continuous belt. Hereby, depending on the construction of the joint, the cross-stiffening elements may even contribute to an improved tensile strength. On the other hand, it may be provided that the cross-stiffening elements are omitted in the end regions so as not to hinder or disturb the joining process.

It is provided that the end regions, if there are any, are connected to one another by a thread creating at least one seam, where, to that end, the at least one thread penetrates the end regions of the belt in a seam region in several stitches, whereby the at least one fabric layer of the belt is embedded in the polymer layer at least across the seam region, and the thread is embedded in the polymer layer in transition regions between the stitches close to the surface at a depth of penetration, in such a way that the thread runs completely or, respectively, for the most part, below surfaces of the belt or, respectively, does not protrude from the belt beyond the surface.

Belts may be joined that may be made of cross-linked polymer, in particular rubber, with embedded fabric inlays at the end regions to create a continuous belt. To this day, making such a joint by way of an additional thread or, respectively, a seam, has never been realized e.g. in a conveyor belt for agricultural machines, due to the high loads in the operation of the belt. This is because in case of such a sewing solution the sewed-in thread will usually protrude from the polymer surface material beyond the surface of the belt so that the thread will be severely compromised due to the high forces occurring, in particular in the overlap region or, respectively, seam region thereby causing the belt joint to become undone after a short period of time.

Owing to the design of the seam this problem will occur no longer or only at a much later time because the thread joining the end regions is preferably fully embedded in the polymer surface material of the belt, e.g. in the rubber layer. Thus, the belt will be in contact with e.g. pulleys or drive rollers or, in the case of a bale press, with the conveyed crop only with its surface so any interaction between these or, respectively, this and the thread can be advantageously avoided because the thread is protected by the polymer surface material in which it is embedded. Thus, forces acting on the surface of the belt will propagate, if at all, only very slightly towards the thread so that the thread itself, in its functions of holding together the end regions of the belt and receiving tensile loads, will be compromised not at all or only after a very long period of time. This strongly improves the durability of such a continuous belt.

It is further provided that a majority of the transition regions between the stitches comprise a direction component which is oriented parallel to a longitudinal direction of the belt and/or in addition at least one assembly seam is provided extending in the seam regions essentially transverse to a longitudinal direction of the belt, the main direction component of the at least one assembly seam preferably extending at an angle of more than 45° with respect to the longitudinal direction of the belt, preferably about 60° with respect to the longitudinal direction of the belt.

The orientation in the longitudinal direction of the belt allows the tensile load on the belt to be efficiently deviated by the thread. The thread preferably conveys the tensile load and possibly further forces into the fabric layer which is penetrated by the stitches at several crossing points by the thread. This can guarantee a particularly high tensile strength of the endless joined belt as well as a high durability of the belt connection.

The assembly seam advantageously serves to press the belt ends against the surface of the belt so as to prevent any fold-over of the end regions emanating from the belt ends. This allows for a permanently constant operation of the belt and for preventing or, respectively, delaying ripping of the belt connection caused by fold-over of the end regions.

In addition or in the alternative, this may also be achieved in that the seam region goes beyond the overlap region at least on one side so that stitches and transition regions of the thread are also located outside the overlap region for pressing-on belt ends of the belt to the surface of the belt. Thus, the seam has to be guided merely across the overlap region thereby simplifying the pressing-on of the belt ends because no further seam is required.

The following numbered clauses include embodiments that are contemplated and non-limiting:

Clause 1. A belt (1) as a continuous traction means for conveyor belts of bale presses or bale wrappers, comprising at least one fabric layer (2) embedded at least in certain regions in a polymer layer (3), for creating a continuous belt (1) reinforced by at least one fabric layer (2), wherein cross-stiffening elements (13) are embedded in the polymer layer (3), for increasing a transverse rigidity (QS) of the belt (1), whereby the cross-stiffening elements (13) are essentially oriented in a transverse direction (Q) of the belt (1), and the belt (1) exhibits, at least in the region of the cross-stiffening elements (13), a ratio of rigidity (QS/LS) between the transverse rigidity (QS) and a longitudinal rigidity (LS) of at least 2:1.

Clause 2. The belt (1) according to clause 1, wherein the cross-stiffening elements (13) are embedded in the polymer layer (3) in the longitudinal direction (L) fully circumferentially, or in segments at an element distance (AE) with respect to one another, or immediately in contact with one another so that the transverse rigidity (QS) of the belt (1) is increased continuously across the entire belt (1) or segment by segment.

Clause 3. The belt (1) according to clause 2, wherein the cross-stiffening elements (13) are arranged in the polymer layer (3) within several segments (14) at the element distance (AE) with respect to one another, or immediately in contact with one another, a segment (14) exhibiting a segment width (BA), and adjacent segments (14) being arranged at a segment distance (AA) with respect to one another, and no cross-stiffening elements (13) being arranged between the segments (14) in the polymer layer (3), the segment width (BA) and the segment distance (AA) having a ratio with respect to one another of between 1:6 and 1:2, preferably 1:3, the segment width (BA) preferably being between 50 mm and 100 mm, preferably 75 mm, and the segment distance (AA) being between 200 mm and 300 mm, preferably 250 mm.

Clause 4. The belt (1) according to one of the above clauses, wherein the cross-stiffening elements (13)

are bands (13a) oriented in the transverse direction (Q), the bands (13a) having an element width (BE) and being arranged at an element distance (AE) with respect to one another, the element width (BE) and the element distance (AE) of the bands (13a) having a ratio with respect to one another of between 1:12 and 1:35, preferably 1:15, the element width (BE) preferably being between 10 mm and 30 mm, preferably being between 20 mm, and the element distance (AE) being between 250 mm and 350 mm, in particular 300 mm, and/or cords (13b) oriented in the transverse direction (Q), the cords (13b) having a diameter of between 0.2 mm and 2.5 mm, preferably 1 mm, and the cords (13b) lying in contact with one another or being spaced apart.

Clause 5. The belt (1) according to one of the above clauses, wherein the rigidity ration (QS/LS) between the transverse rigidity (QS) and the longitudinal rigidity (LS) is at least 3:1, preferably at least 5:1, in particular at least 10:1.

Clause 6. The belt (1) according to one of the above clauses, wherein the cross-stiffening elements (13) are oriented in the polymer layer (3) exactly in the transverse direction (Q) or at an angle of between +15° and −15°, preferably between +5° and −5°, with respect to the transverse direction (Q).

Clause 7. The belt (1) according to one of the above clauses, wherein an edge distance (AR) of between 2 mm and 50 mm is provided between the cross-stiffening elements (13) and the margins (15) of the belt (1).

Clause 8. The belt (1) according to one of the above clauses, wherein the cross-stiffening elements (13) are omitted in partial regions (TB) of the belt (1), for example, in a middle partial region (TBm) of the belt (1).

Clause 9. The belt (1) according to one of the above clauses, wherein the cross-stiffening elements (13) exhibit a modulate of elasticity of more than 25 kN/mm², in particular, more than 35 kN/mm², preferably more than 50 kN/mm².

Clause 10. The belt (1) according to one of the above clauses, wherein the cross-stiffening elements (13) are made of metal, e.g. of spring steel, or of fiber-reinforced plastics, e.g. with fibers of glass or carbon or aramid, or of textile fibers, or monofil thermoplastic yarns.

Clause 11. The belt (1) according to one of the above clauses, wherein end regions (1a, 1b) of the belt (1) are directly or indirectly connected to one another for creating a continuous belt (1), where, to that end, the end regions (1a, 1b) of the belt (1) lie flat upon one another in the overlap region (4) and are joint together at least in certain sections in the overlap region (4), for example, by means of sewing, gluing, screwing, riveting, vulcanizing, or the end regions (1a, 1b) are held together by means of a belt joint.

Clause 12. The belt (1) according to clause 11, wherein the cross-stiffening elements (13) are omitted in the end regions (1a, 1b).

Clause 13. The belt (1) according to clause 11 or 12, wherein the end regions (1a, 1b) are connected to one another by a thread (7) creating at least one seam (9), where, to that end, the at least one thread (7) penetrates the end regions (1a, 1b) of the belt (1) in a seam region (6) in several stitches (8), where the at least one fabric layer (2) of the belt (1) is embedded in the polymer layer (3) at least across the seam region (6), and the thread (7) is embedded in the polymer layer (3) in transition regions (20) between the stitches (8) close to the surface at a depth of penetration (T) in such a way that the thread (7) runs completely or at least mostly below surfaces (10a, 10b) of the belt (1).

Clause 14. The belt (1) according to one of the clauses 11 through 13, wherein a majority of the transition regions (20) between the stitches (8) comprise a direction component, which is oriented parallel to a longitudinal direction (L) of the belt (1), and/or in addition at least one assembly seam (25) is provided, extending in the seam region (6) essentially transverse to a longitudinal direction (L) of the belt (1).

Clause 15. The belt (1) according to one of the clauses 11 through 14, wherein the seam region (6) goes beyond the overlap region (4) at least on one side so that stitches (8) and transition regions (20) of the thread (7) are also located outside the overlap region (4) for pressing-on belt ends (11a, 11b) of the belt (1) to the surface (10a, 10b) of the belt (1).

The invention claimed is:

1. A belt as a continuous traction means for conveyor belts of bale presses or bale wrappers, comprising
    at least one fabric layer embedded at least in certain regions in a polymer layer, for creating a continuous belt reinforced by at least one fabric layer,
    wherein cross-stiffening elements are embedded in the polymer layer, for increasing a transverse rigidity of the belt, whereby the cross-stiffening elements are essentially oriented in a transverse direction of the belt, and the belt exhibits, at least in the region of the cross-stiffening elements, a ratio of rigidity between the transverse rigidity and a longitudinal rigidity of at least 2:1.

2. The belt of claim 1, wherein the cross-stiffening elements are embedded in the polymer layer in the longitudinal direction fully circumferentially, or in segments at an element distance with respect to one another, or immediately in contact with one another so that the transverse rigidity of the belt is increased continuously across the entire belt or segment by segment.

3. The belt of claim 2, wherein the cross-stiffening elements are arranged in the polymer layer within several segments at the element distance with respect to one another, or immediately in contact with one another, a segment exhibiting a segment width, and adjacent segments being arranged at a segment distance with respect to one another, and no cross-stiffening elements being arranged between the segments in the polymer layer, the segment width and the segment distance having a ratio with respect to one another of between 1:6 and 1:2, preferably 1:3, the segment width preferably being between 50 mm and 100 mm, preferably 75 mm, and the segment distance being between 200 mm and 300 mm, preferably 250 mm.

4. The belt of claim 1, wherein the rigidity ratio between the transverse rigidity and the longitudinal rigidity is at least 3:1, preferably at least 5:1, in particular at least 10:1.

5. The belt of claim 1, wherein the cross-stiffening elements are oriented in the polymer layer in the transverse direction or at an angle of between +15° and −15°, preferably between +5° and −5°, with respect to the transverse direction.

6. The belt of claim 1, wherein an edge distance of between 2 mm and 50 mm is provided between the cross-stiffening elements and the margins of the belt.

7. The belt of claim 1, wherein the cross-stiffening elements are omitted in partial regions of the belt, for example, in a middle partial region of the belt.

8. The belt of claim 1, wherein the cross-stiffening elements exhibit a modulus of elasticity of more than 25 kN/mm², in particular, more than 35 kN/mm², preferably more than 50 kN/mm².

9. The belt of claim 1, wherein the cross-stiffening elements are made of metal, e.g. of spring steel, or of fiber-reinforced plastics, e.g. with fibers of glass or carbon or aramid, or of textile fibers, or monofil thermoplastic yarns.

10. The belt of claim 1, wherein end regions of the belt are directly or indirectly connected to one another for creating a continuous belt, where, to that end, the end regions of the belt lie flat upon one another in an overlap region and are joined together at least in certain sections in the overlap region, for example, by means of sewing, gluing, screwing, riveting, vulcanizing, or the end regions are held together by means of a belt joint.

11. The belt of claim 10, wherein the cross-stiffening elements are omitted in the end regions.

12. A belt as a continuous traction means for conveyor belts of bale presses or bale wrappers, comprising
  at least one fabric layer embedded at least in certain regions in a polymer layer, for creating a continuous belt reinforced by at least one fabric layer,
  wherein cross-stiffening elements are embedded in the polymer layer, for increasing a transverse rigidity of the belt, whereby the cross-stiffening elements are essentially oriented in a transverse direction of the belt, and the belt exhibits, at least in the region of the cross-stiffening elements, a ratio of rigidity between the transverse rigidity and a longitudinal rigidity of at least 2:1,
  wherein the cross-stiffening elements are bands oriented in the transverse direction, the bands having an element width and being arranged at an element distance with respect to one another, the element width and the element distance of the bands having a ratio with respect to one another of between 1:12 and 1:35, preferably 1:15, the element width preferably being between 10 mm and 30 mm, preferably being between 20 mm, and the element distance being between 250 mm and 350 mm, in particular 300 mm, and/or cords oriented in the transverse direction, the cords having a diameter of between 0.2 mm and 2.5 mm, preferably 1 mm, and the cords lying in contact with one another or being spaced apart.

13. A belt as a continuous traction means for conveyor belts of bale presses or bale wrappers, comprising
  at least one fabric layer embedded at least in certain regions in a polymer layer, for creating a continuous belt reinforced by at least one fabric layer,
  wherein cross-stiffening elements are embedded in the polymer layer, for increasing a transverse rigidity of the belt, whereby the cross-stiffening elements are essentially oriented in a transverse direction of the belt, and the belt exhibits, at least in the region of the cross-stiffening elements, a ratio of rigidity between the transverse rigidity and a longitudinal rigidity of at least 2:1,
  wherein end regions of the belt are directly or indirectly connected to one another for creating a continuous belt, where, to that end, the end regions of the belt lie flat upon one another in an overlap region and are joined together at least in certain sections in the overlap region, for example, by means of sewing, gluing, screwing, riveting, vulcanizing, or the end regions are held together by means of a belt joint, and
  wherein the end regions are connected to one another by at least one thread creating at least one seam, where, to that end, the at least one thread penetrates the end regions of the belt in a seam region in several stitches, where the at least one fabric layer of the belt is embedded in the polymer layer at least across the seam region, and the at least one thread is embedded in the polymer layer in transition regions between the stitches close to the surface at a depth of penetration in such a way that the at least one thread runs completely or at least mostly below surfaces of the belt.

14. The belt of claim 13, wherein a majority of the transition regions between the stitches comprise a direction component, which is oriented parallel to a longitudinal direction of the belt, and/or in addition at least one assembly seam is provided, extending in the seam region transverse to a longitudinal direction of the belt.

15. The belt of claim 14, wherein the seam region goes beyond the overlap region at least on one side so that the stitches and the transition regions of the thread are also located outside the overlap region for pressing-on belt ends of the belt to the surface of the belt.

* * * * *